United States Patent [19]

Day et al.

[11] 3,986,710
[45] Oct. 19, 1976

[54] QUENCH UNIT FOR INDUCTIVELY HEATED WORKPIECES

[75] Inventors: Paul L. Day; David R. Soworowski, both of Parma, Ohio

[73] Assignee: Park-Ohio Industries, Inc., Cleveland, Ohio

[22] Filed: June 19, 1975

[21] Appl. No.: 588,138

[52] U.S. Cl. .............................. 266/129; 134/122 R; 134/199
[51] Int. Cl.[2] .......................................... C21D 9/28
[58] Field of Search ............ 266/4 R, 4 S, 6 R, 4 EI, 266/129; 134/122 R, 199

[56] References Cited
UNITED STATES PATENTS

| | | | |
|---|---|---|---|
| 2,924,230 | 2/1960 | Dessarts | 134/122 R |
| 3,556,491 | 1/1971 | Greis | 266/4 EI |
| 3,556,499 | 1/1971 | Hammon | 266/4 R |
| 3,622,138 | 11/1971 | Kostyal | 266/4 EI X |
| 3,720,803 | 3/1973 | Lewis | 266/4 EI X |

Primary Examiner—Roy Lake
Assistant Examiner—Paul A. Bell
Attorney, Agent, or Firm—Meyer, Tilberry & Body

[57] ABSTRACT

Apparatus for quench hardening the surface of a previously inductively heated, elongated workpiece as it moves along a feed path, this apparatus comprises a quenching means surrounding the feed path, the quenching means includes an inwardly facing apertured wall facing the feed path, means for forcing a quenching liquid through the apertured wall toward the feed path for quenching the surface of the heated workpiece as it passes along the feed path and means for moving the apertured workpiece in a direction generally transverse to the feed path. In the preferred embodiment, the apertured wall is generally circular and is rotated around the workpiece.

3 Claims, 5 Drawing Figures

QUENCH UNIT FOR INDUCTIVELY HEATED WORKPIECES

This invention relates to the art of inductively heating and then quench hardening an elongated workpiece and more particularly to an improved quench unit for an inductively heated workpiece.

The invention is particularly applicable for inductively heating relatively short elongated steel pins, and it will be described with particular reference thereto; however, it is appreciated that the invention has much broader applications and may be used for inductively heating and then quench hardening the surfaces of a variety of elongated workpieces capable of being moved successively along a feed path.

In many instances it is necessary to provide hardened outer surfaces on pins, such as those used in tractor treads. These pins are often approximately 5 inches long and have a relatively small diameter, such as about ¾ inch. As is well known, hardened surfaces on elongated workpieces, such as these track pins, can be provided economically by first inductively heating the outer surfaces of the pins and then quench hardening these surfaces to the desired hardness. A variety of installations have been employed for inductively heating such elongated workpieces preparatory to susbsequent quench hardening. The most common installation includes a multi-turn coil through which the elongated workpieces are progressed successively, with an incoming workpiece forcing a preceding workpiece through the coil or inductor. Thereafter, the heated workpiece is quench hardened in a dunk tank. To preclude formation of steam at various locations on the surface of the workpiece, the quenching liquid is agitated in the tank during the quenching cycle. This destroys any gas or vapor pockets which can cause a lack of uniform hardness at certain areas of the surface. Such equipment requires reorientation of the workpieces after they have been quench hardened. A similar apparatus for inductively heating an elongated workpiece includes a spinning feed arrangement which rotates the workpieces as they are moved through the induction heating coil or inductor. This provides uniform heating during the induction heating operation. Still a dunk tank quenching arrangement was used at the outlet on the heating coil. When a relatively short pin is to be inductively heated by the spinning feed arrangement, it is necessary to provide a spinning withdraw unit at the exit end of the inductor. Otherwise, a short workpiece would stop rotating while it was still in the heating passageway of the inductor. The use of a spinning withdraw mechanism somewhat delays the time for subsequent quench hardening after the actual heating operation. All of these prior units involve the loss of control over the elongated workpieces. In addition, when the workpieces are relatively short, in the neighborhood of 5 inches, and require a substantial amount of heating for proper hardness after quenching, the dual spinning feed arrangement is not appropriate. The coil would be too long to allow engagement of the spinning withdraw unit before the short workpiece leaves the spinning feed device. These disadvantages of prior arrangements for inductively heating elongated workpieces, such as cylindrical pins for tractor tracks, are overcome by the present invention.

In accordance with the present invention, there is provided an apparatus for quench hardening the surface of a previously inductively heated, elongated workpiece as it moves along a feed path. This apparatus comprises a quenching means surrounding the feed path itself and including an inwardly facing apertured wall facing the feed path, means for forcing a quenching liquid through the apertured wall toward the feed path for quenching the surface of the heated workpiece, as it passes along the feed line, and means for moving the apertured wall in a direction transverse of the feed path. In accordance with the preferred embodiment of the invention, the apertured wall is generally cylindrical and is rotated around the feed path. In this manner, the relatively short pins can exit directly from the induction heating coil or inductor and pass into the quenching unit which may include cantilevered guide rails. The elongated workpieces are passed along the rails while the apertured quenching wall is rotated around the workpieces. In this manner, uniform quenching is accomplished without losing control of the moving workpieces.

By rotating the apertured wall through which quenching fluid is forced, gas pockets will not form on the surfaces of the successive workpieces. Thus, uniformity of the quenching operation is assured without requiring a dunk tank having appropriate agitation developing means.

In accordance with another aspect of the invention, there is provided an apparatus for inductively heating and quench hardening the outer surface of an elongated workpiece having a central axis and a given length. This apparatus includes means for feeding the workpiece in a direction corresponding to the central axis and along a feed path, a first guide means having an outlet end at a selcted first position on the feed path, a multi-turn inductor having a central workpiece passageway adjacent the first position, with the passageway extending along the feed path, a second guide means having an inlet end at a selected second position on the feed path, with the second position being spaced from the first position a distance substantially less than the given length of the workpiece, and a second guide means including means for exposing the outer surface of the workpieces as they pass along the feed path, and a quenching means surrounding the second guide means. The quenching means is constructed in accordance with the structure mentioned in the first aspect of the present invention.

The primary object of the present invention is the provision of a quench unit for quenching inductively heated elongated workpieces, which unit quenches the workpieces as they move along a feed path extending from an induction heating inductor.

Another object of the present invention is the provision of a quench unit for quenching inductively heated elongated workpieces, which unit rotates around the workpieces as they move in a straight line.

Another object of the present invention is the provision of a quench unit, as defined above, which quench unit does not require loss of control over the elongated workpieces as they pass from the inductor through the quench unit.

Another object of the present invention is the provision of a quenching unit as defined above, which unit can be used for relatively short workpieces.

Still a further object of the present invention is the provision of a quench unit as defined above, which unit can be mounted directly adjacent the exit end of an inductor coil used for inductively heating the workpieces.

Yet another object of the present invention is the provision of a quenching unit as defined above, which unit reduces a tendency of gas pockets to form on the surface of workpieces, as they are moved and quenched.

These and other objects and advantages will become apparent from the following description taken together with the accompanying drawings in which.

Figure 1:
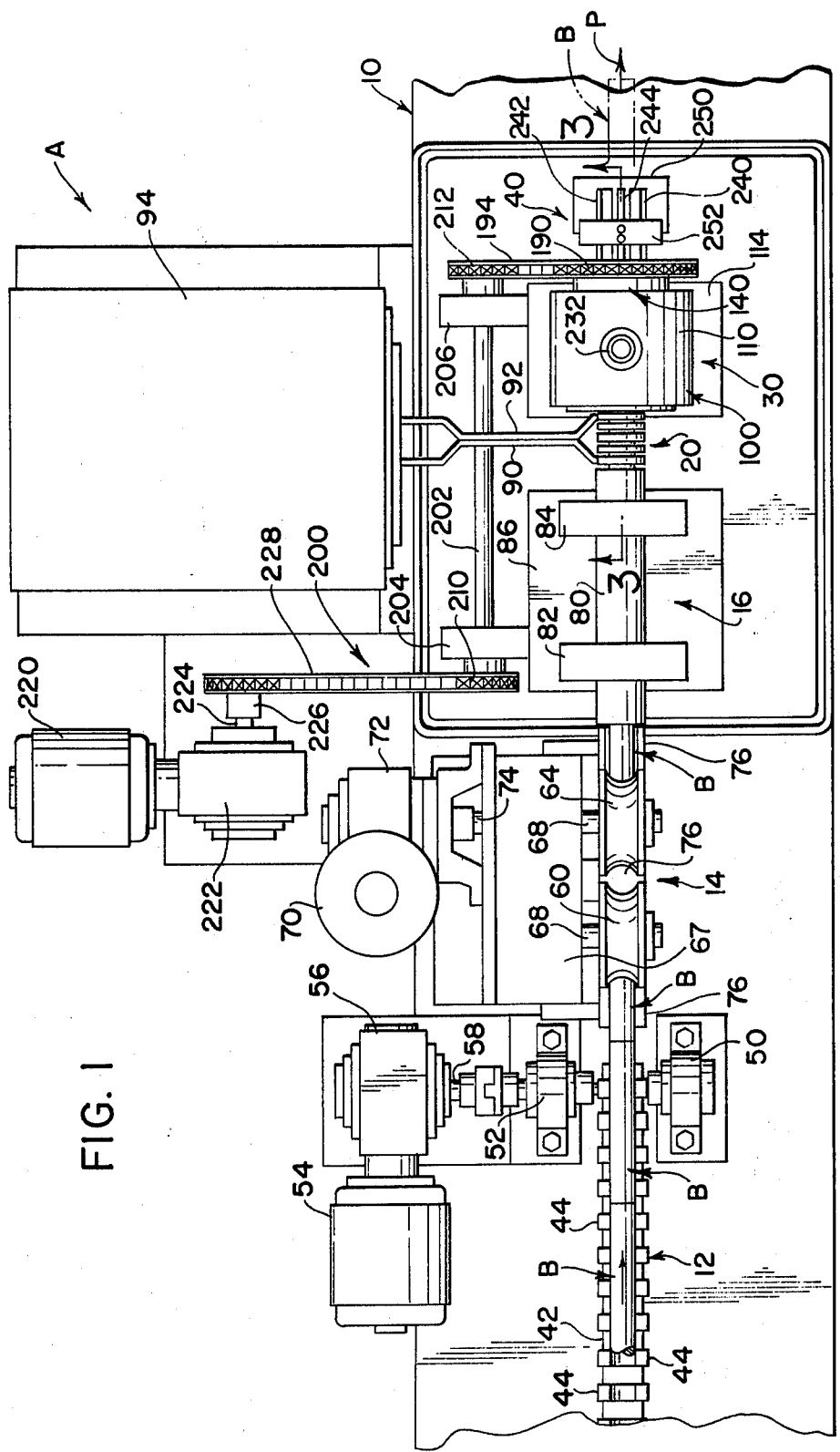
FIG. 1 is a top plan view illustrating the preferred embodiment of the present invention.
Figure 2:
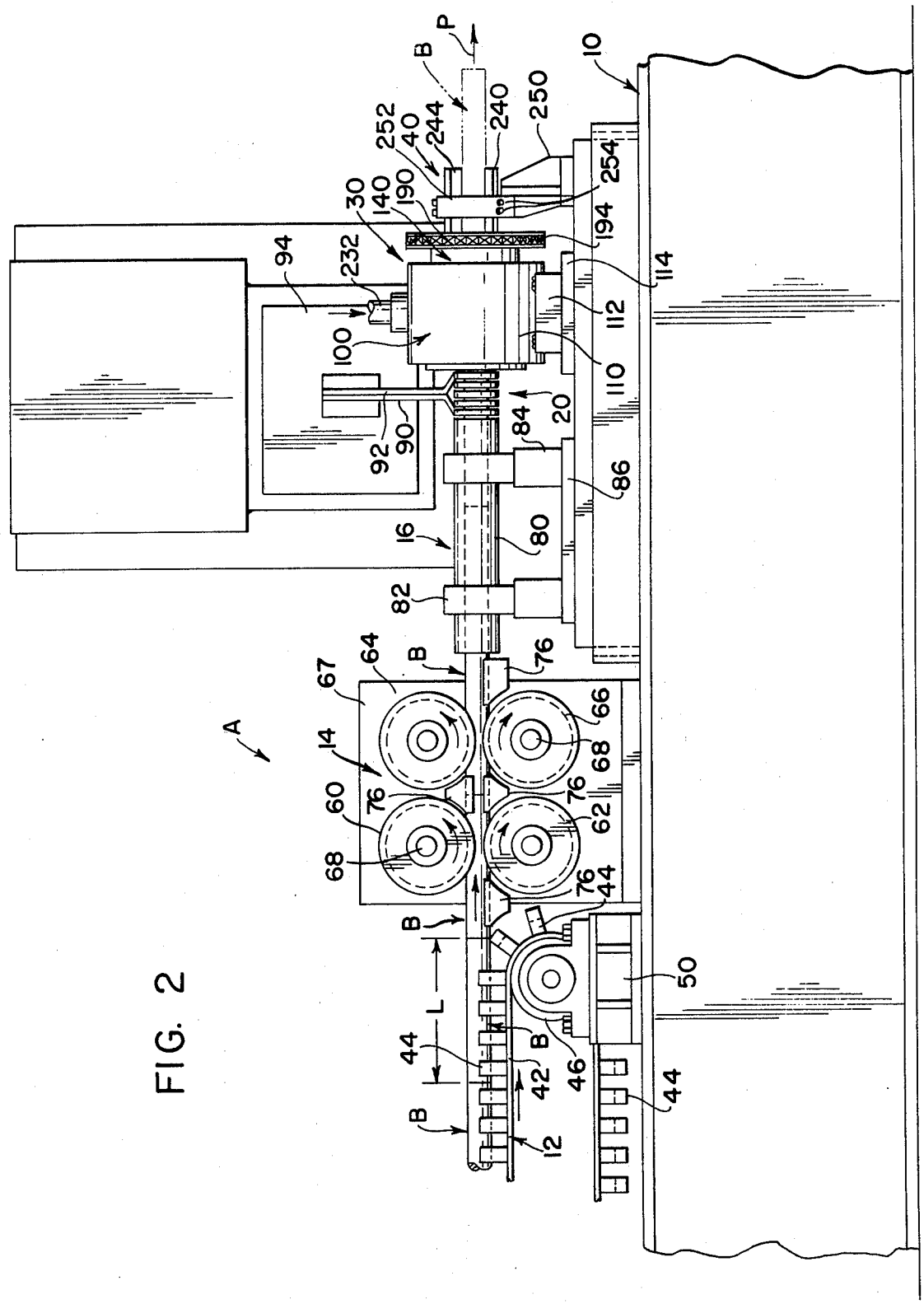
FIG. 2 is a side elevational view illustrating the preferred embodiment as shown in FIG. 1.

Referring now to the drawings, FIGS. 1 and 2 illustrate induction heating and quench hardening apparatus A for inductively heating the outer surface of an elongated workpiece B as it passes in a generally straight line defining a feed path P. In accordance with the illustrated embodiment of the invention, the workpieces are track pins for a tractor type vehicle and have a given length L, shown in FIG. 2. In practice, this length is approximately 4–5 inches and the end diameter is approximately ¾ inch. These pins are relatively short for induction heating by continuously passing the pins successively through an induction heating coil or inductor. In accordance with the preferred embodiment of the invention, apparatus A includes a support base 10, an appropriate conveyor, such as belt feeder 12, a drive arrangement, such as roll feeder 14, a first guide means 16, induction heating coil or inductor 20, an improved quenching unit 30 and a second guide means 40. All of these components are assembled to allow movement of workpieces B along the feed path P. Belt feeder 12 forces the workpieces in end-to-end relationship to roll feeder 14, which feeds the workpieces forward through guide means 16 and inductor 20. At the inductor, the outer surfaces of the workpieces are heated inductively to a quench hardening temperature. Thereafter, workpieces B bass through the improved quenching unit 30 where they are quench hardened to provide the required outer surface hardness on each of the workpieces. Continued movement of the workpieces by the roll feeder 16 forces the workpieces along second guide means 40 to an appropriate outlet conveying system, not shown. There is no further quenching as the workpieces have been quench hardened by unit 30 and the processing has been completed. Thus, the workpieces have hardened surfaces when they exit from apparatus A.

Referring now in more detail to the specific components of the preferred embodiment, the first conveying arrangement shown as a belt feeder 12 includes a continuous belt 42 having axially spaced nest 44. A drive wheel 46 supported in journals 50, 52 is driven by a motor 54 through a gear reducer 56 and a drive shaft 58. Of course, the entrance end of belt feeder 12 includes an appropriate support wheel and a magazine or other arrangement for feeding workpieces along the belt. Although not shown, the workpieces may be spaced on the belt feeder since the roll feeder 14 drives the workpieces successively through the remaining components of apparatus A. This roll feeder includes spaced pinch rolls 60, 62, 64 and 66 driven by an appropriate mechanism 67 by shafts 68. To drive these shafts, there is provided a motor 70 connected to a gear reducer 72 having an output drive shaft 74 for driving shafts 68 in the appropriate direction for forcing successive workpieces B to the right, as shown in FIGS. 1 and 2. Appropriate guides 76 control the direction of movement and stability of workpieces B as they pass through and are driven by the pinch rolls 60–66.

Referring now to the first guide means 16, this mechanism includes a changeable tube 80 having an internal diameter which matches the external diameter of workpieces B and a length which is substantially greater than the length L of the workpieces. In practice, the length of guide tube 80 is at least 50% longer than the workpiece. Tube 80, which is only one of various types of guiding arrangements which could be used, is supported on spaced stands 82, 84 supported in turn upon platform 86 secured to support base 10. Tube 80 includes an entrance end and an exit end. The exit end is immediately adjacent the induction heating coil or inductor 20. This coil includes a central workpiece passage 88 and two spaced leads 90, 92 connected across the output of an appropriate alternating current power supply 94 shown in FIGS. 1 and 2 as a transformer and in FIG. 3 as a generator. In practice, an appropriate generator energizes a transformer which in turn passes an alternating current through multi-turn inductor 20. Inductor 20 is changed when the diameter of the workpiece is changed so that the internal diameter of passage 88 provides the air gap needed for proper heating.

Figure 3:
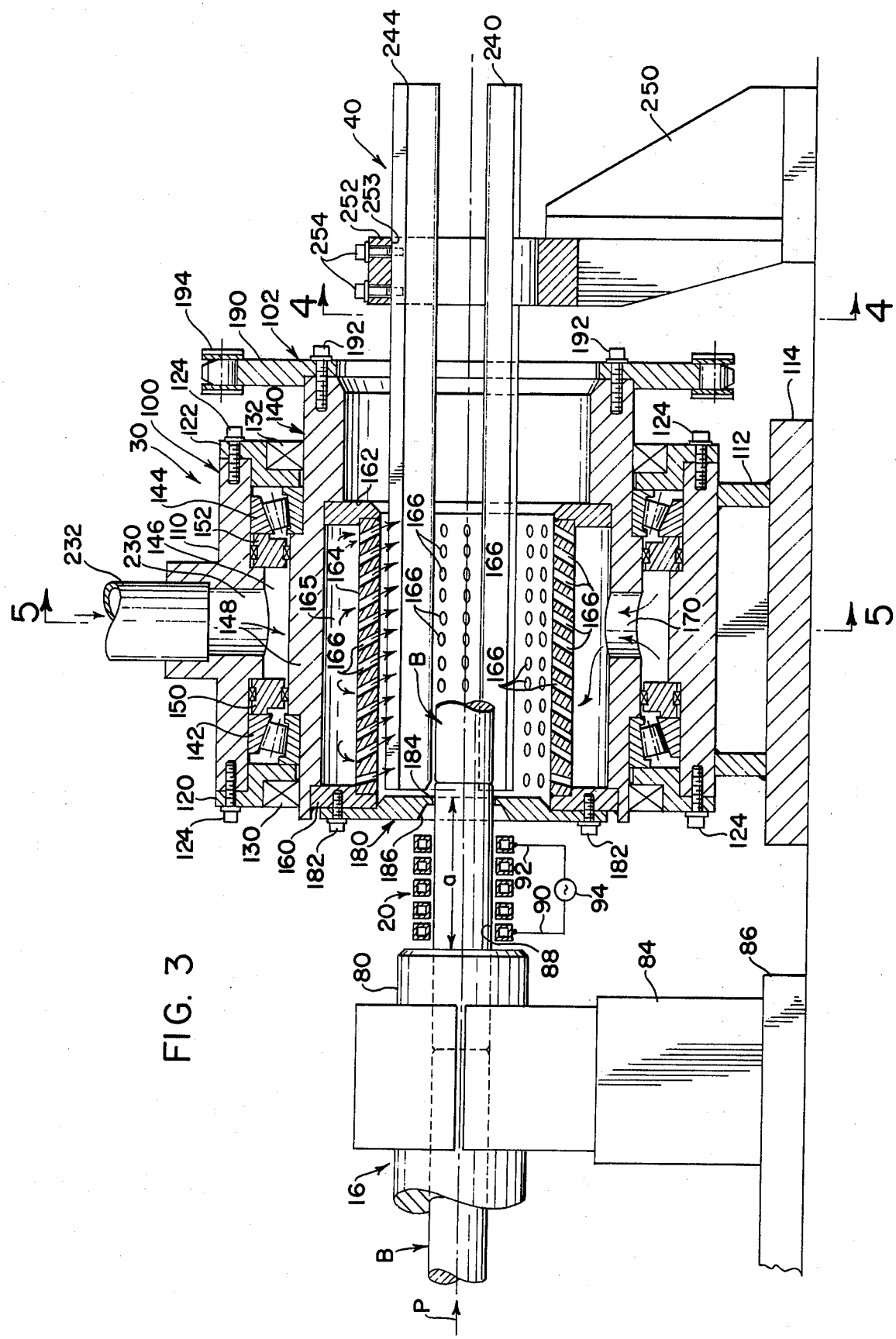
FIG. 3 is an enlarged cross-sectional view taken generally along line 3—3 of FIG. 1.
Figure 4:
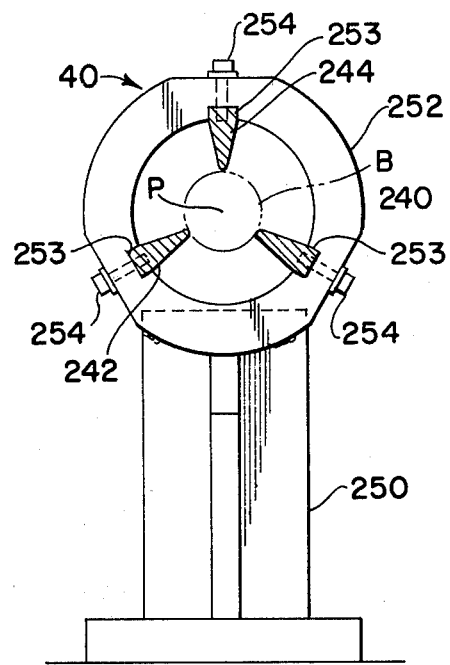
FIG. 4 is a cross-sectional view taken generally along line 4—4 of FIG. 3.
Figure 5:
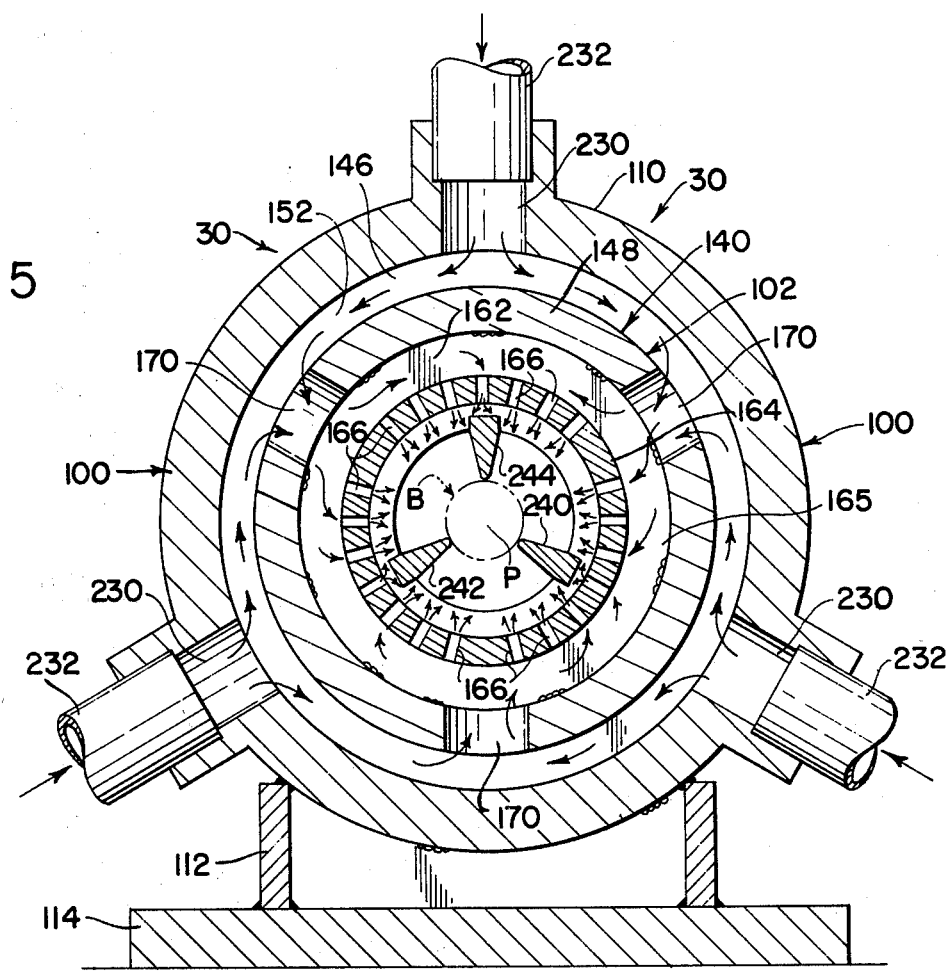
FIG. 5 is a cross-sectional view taken generally along line 5—5 of FIG. 3.

The primary aspect of the present invention is the improved quench unit 30 best shown in FIGS. 3, 4 and 5. This quench unit allows passage of workpieces B through the unit while they are being quenched and provides an arrangement for precluding the formation of vapor pockets which can adversely affect the uniformity of the hardened surface on the workpiece. The spacing a between the workpiece supporting structure of quench unit 30 and guide tube 80 is less than the length L of workpieces B. In this manner control over the workpieces is maintained and the workpiece remains centered in inductor 20. Essentially, improved quench unit 30 includes an arrangement for rotating an apertured wall about the workpiece as it is moving through the unit. By passing quenching liquid through the apertures of the wall, agitation is created at the surface by impinging the quenching liquid at moving locations on the surface of the workpiece. A variety of structures could be used for this purpose; however, in accordance with the illustrated embodiment of the invention, the improved quenching unit 30 includes a stationary structure 100 and a rotating structure 102. The stationary structure comprises a hollow housing 110 secured by weldment 112 to base 114 supported on base 10. End plates 120, 122 are secured onto fixed hollow housing 110 by appropriate devices, such as bolts 124. Seals 130, 132 form a seal between stationary structure 100 and rotating structure 102. Rotating structure 102 includes a hollow, generally cylindrical housing 140 rotatably mounted in housing 110 by axially spaced bearings 142, 144. A liquid chamber 146 is defined between a wall 148 of housing 140 and housing 110. Sealing rings 150, 152 close the axial ends of chamber 146 so that liquid can be directed from the stationary structure to the rotating structure of quenching unit 30. A pair of end rings 160, 162 combine with a cylindrical apertured wall 164 to define an internal coolant reservoir 165. These structures are secured with respect to wall 148 for rotation with cylindrical housing 140. A plurality of closely spaced rearwardly directed apertures 166 in wall 164 allows fluid flow through wall 164, as the wall is rotated about a workpiece passing along feed path P. Ports 170 in wall 148 of housing 140 communicate the liquid reservoir 165 with inlet chamber 146 as best shown in FIG. 5. The internal diameter of wall 164 is sufficiently large to accommodate the various size workpieces. To prevent or substantially eliminate splashing of coolant from unit 30 toward inductor 20, there is provided a splash shield 180 which is changeable to accommodate different sized workpieces. This shield is secured onto end ring 160 by an appropriate arrangement, such as bolts 182. A central workpiece opening 184 is dimensioned to accommodate the particular workpiece being processed and is provided with a conical guide portion 186. To rotate the rotatable structure 102, housing 140 includes a sprocket 190 secured thereto by circumferentially spaced bolts 192. A chain 194 is provided around sprocket 190 so that an appropriate drive mechanism 200 can rotate housing 140 at the desired rotational speed.

Drive mechanism 200 could take a variety of structural forms; however, in accordance with the illustrated embodiment of the invention, this mechanism includes an outboard shaft 202 rotatably mounted in journals 204, 206 and provided at both ends with sprockets 210, 212. An appropriately positioned motor 220 drives a gear reducer 222 having an output drive shaft 224 with a sprocket 226. A chain 228 drivingly connects sprocket 226 with sprocket 210 as shown in FIG. 1. This rotates shaft 202 to drive sprocket 190 through sprocket 212 and chain 194. In this manner, housing 140 is rotated at an appropriate speed to rotate apertured wall 164 around feed path P.

As best shown in FIG. 5, stationary housing 110 is provided with a plurality of liquid ports 230 communicating with tubes 232 for directing quenching liquid into liquid inlet chamber 146. From this chamber, the quenching fluid flows through ports 170, as best shown in FIG. 5, to the liquid reservoir 165 which is rotating with housing 140. From this reservoir, the quenching liquid under pressure is forced through apertures 166 in apertured wall 164. Fine jets of quenching liquid are directed against the outer, heated surface of the workpieces as they pass through quenching unit 30. Consequently, the previously heated surface is quench hardened to the desired hardness.

To guide workpieces B as they pass through unit 30, there is provided an appropriate second guide means 40 which is changeable to accommodate different sized workpieces. The second guide means may take a variety of structural forms; however, in the preferred embodiment of the invention, cantilever rails 240, 242 and 244 have inwardly tapered cross-section and extend into the quenching unit to a position adjacent inductor 20. A variety of structures could be used for mounting these rails; however, in accordance with the illustrated embodiment of the invention, stand 250 includes an upper ring 252 surrounding path P and generally concentric with the rotating axis of housing 140. This ring includes a plurality of circumferentially spaced grooves 253, two of which are secured to the lower portion of ring 252 for supporting the workpieces as they pass through unit 30. Bolts 254 hold the supporting rails in place within grooves 252. These rails extend rearwardly of ring 252 for reducing the effective torque transmitted from the rails to the support ring 252. The workpieces at the exit end of rails 240, 242 apply a torque to the rails in an opposite direction than the workpieces within unit 30. These two torques cancel each other to reduce the tendency of the rails to be removed from their supporting structures.

The above description of the preferred embodiment of the present invention shows how the invention is used to heat inductively the outer surfaces of relatively short elongated workpieces and then quench harden the workpieces as they are moved along a given feed path in a manner to reduce the tendency for formation of vapor pockets on the heated surfaces being quenched.

Having thus defined our invention, we claim:

1. An apparatus for inductively heating and then quench hardening the outer surface of an elongated workpiece having a central axis and a given length, said apparatus comprising: means for feeding said workpiece in a direction corresponding to said central axis and along a feed path; a first guide means having an outlet end at a selected first position on said feed path; a stationary, multi-turn inductor having a central workpiece passageway adjacent said first position, with said passageway extending along said feed path; a second guide means having an inlet end at a selected second position on said feed path, with said second position being spaced from said first position a distance substantially less than said given length; said second guide means including means for exposing said outer surface; and a quenching means independent of said inductor surrounding said second guide means, said quench means being spaced axially from said inductor and including an inwardly facing, elongated, cylindrical, apertured wall facing said feed path, means for forcing a quenching liquid through said apertured wall toward said feed path for quenching a heated workpiece passing along said second guide means and means for rotating said cylindrical, apertured wall in a circular direction concentrically around said feed path.

2. An apparatus as defined in claim 1 including a shield means adjacent said second position for limiting flow of quenching liquid from said second position toward said inductor.

3. An apparatus as defined in claim 2 wherein said shield means includes a plate extending generally perpendicular to said feed path and means forming a workpiece opening in said plate and generally surrounding said feed path.

* * * * *